(12) United States Patent
Spyra et al.

(10) Patent No.: US 12,215,655 B2
(45) Date of Patent: Feb. 4, 2025

(54) INTERNAL COMBUSTION ENGINE

(71) Applicant: INNIO Jenbacher GmbH & Co OG, Jenbach (AT)

(72) Inventors: Nikolaus Spyra, Innsbruck (AT); Wolfgang Fimml, Maurach in Tirol (AT); Michael Url, Neufahrn (DE)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/556,334

(22) PCT Filed: Apr. 19, 2021

(86) PCT No.: PCT/AT2021/060127
§ 371 (c)(1),
(2) Date: Oct. 19, 2023

(87) PCT Pub. No.: WO2022/221889
PCT Pub. Date: Oct. 27, 2022

(65) Prior Publication Data
US 2024/0191677 A1 Jun. 13, 2024

(51) Int. Cl.
*F02M 21/02* (2006.01)
*F02B 29/04* (2006.01)
(Continued)

(52) U.S. Cl.
CPC ..... *F02M 21/0206* (2013.01); *F02D 41/0027* (2013.01); *F02M 21/0227* (2013.01);
(Continued)

(58) Field of Classification Search
CPC ............... F02M 21/0206; F02M 21/06; F02M 21/0227; F02D 41/0027; F02B 29/0493
See application file for complete search history.

(56) References Cited

U.S. PATENT DOCUMENTS 3,455,282 A 7/1969 Pearsall
4,381,755 A * 5/1983 Caracciolo ............. F02M 25/06
123/573
(Continued)

FOREIGN PATENT DOCUMENTS

DE 102015213930 A1 1/2017
EP 2378094 A1 10/2011
(Continued)

OTHER PUBLICATIONS

PCT International Search Report and Written Opinion; Application No. PCT/AT2021/060127; dated Feb. 4, 2022; 7 pages.
(Continued)

*Primary Examiner* — Kevin A Lathers
(74) *Attorney, Agent, or Firm* — Fletcher Yoder, P.C.

(57) ABSTRACT

An internal combustion engine includes an intake manifold, at least one intercooler, at least one cylinder head with a plurality of piston-cylinder-units, at least one ammonia source, and a controller. Each piston-cylinder-unit includes at least a main combustion chamber, at least one intake valve, and an ignition device. The at least one ammonia source is configured to provide ammonia to each piston-cylinder unit as part of a combustion charge. The controller is configured to control the intercooler to provide a gaseous medium with a temperature of at least 60° C. to the intake manifold, and control a lambda of the combustion charge inside each main combustion chamber to be between 0.9 and 1.2.

19 Claims, 5 Drawing Sheets

(51) Int. Cl.
    *F02D 13/02*     (2006.01)
    *F02D 41/00*     (2006.01)
    *F02G 5/02*     (2006.01)
    *F02M 21/06*     (2006.01)

(52) U.S. Cl.
    CPC ......... *F02M 21/06* (2013.01); *F02B 29/0493* (2013.01); *F02D 13/0261* (2013.01); *F02G 5/02* (2013.01)

(56) References Cited

U.S. PATENT DOCUMENTS

| | | | |
|---|---|---|---|
| 2009/0133400 A1* | 5/2009 | Callas | F02C 7/143 60/730 |
| 2010/0019506 A1 | 1/2010 | Gong et al. | |
| 2011/0114069 A1 | 5/2011 | Grannell et al. | |
| 2011/0259290 A1 | 10/2011 | Michikawauchi et al. | |
| 2012/0096869 A1 | 4/2012 | Kesseli et al. | |
| 2017/0022882 A1* | 1/2017 | Sturman | F02D 41/3058 |

FOREIGN PATENT DOCUMENTS

| | | | | |
|---|---|---|---|---|
| EP | 3540197 A1 | 9/2019 | | |
| WO | 02071451 A2 | 9/2002 | | |
| WO | WO-2019035718 A1 * | 2/2019 | .......... | F02B 19/1028 |

OTHER PUBLICATIONS

Mukherjee Shreya et al., "Low Temperature Ammonia Decomposition Catalysts for Hydrogen Generation", Applied Catalysis B. Environmental, Elsevier, Amsterdam, NL., vol. 226, Dec. 16, 2017 (Dec. 16, 2017), pp. 162-181, XP085636162, https://dx.doi.org/10.1016/j.apcatb.2017.12.039.

* cited by examiner

INTERNAL COMBUSTION ENGINE

CROSS-REFERENCE TO RELATED APPLICATION

This application is a National Stage entry from, and claims benefit of, PCT Application No. PCT/AT2021/060127, filed on Apr. 19, 2021, entitled "INTERNAL COMBUSTION ENGINE", which is herein incorporated by reference in its entirety.

BACKGROUND

The invention concerns an internal combustion engine in which a main fuel for internal combustion is ammonia ($NH_3$). In another aspect, the invention concerns a genset for generation of electric power. In yet another aspect, the invention concerns a combined-heat-and-power plant.

Such internal combustion engines are disclosed in US 2011/0114069 A1, US 2011/0259290A1, EP 2 378 094 A1, US 2010/0019506 A1, and WO 2019/035718 A1.

U.S. Pat. No. 3,455,282 discloses an internal combustion engine having main combustion chambers with a compression ratio between 12 and 16, which are provided with a spark plug to start combustion of a combustion charge consisting of air and ammonia. The addition of small quantities of hydrogen as a combustion promoter is discussed.

BRIEF DESCRIPTION

It is an aspect of the invention, in certain embodiments, to provide an internal combustion engine having the ability to use ammonia as a main fuel with a reduced need of using a combustion promoter. It is another aspect of the invention, in certain embodiments, to provide a genset for generation of electric power. It is yet another aspect of the invention, in certain embodiments, to provide a combined-heat-and-power-plant.

These aspects are achieved by an internal combustion engine having the features of the claims, a genset comprising an electric generator coupled to such an internal combustion engine, and a combined-heat-and-power-plant having the features of the claims. Embodiments of the invention are defined in the dependent claims.

In an internal combustion engine according to certain embodiments of the invention, there is provided at least:
an intake manifold which can provide gaseous medium (air, a mixture of air and ammonia in gaseous form, a mixture of air and ammonia partly in liquid and partly in gaseous form, one of the aforementioned with a combustion promoter in liquid or gaseous form) to a plurality of piston-cylinder-units,
at least one intercooler coupled to the intake manifold,
at least one cylinder head with a plurality of piston-cylinder-units,
at least one ammonia source for providing ammonia to each piston-cylinder-unit as part of the combustion charge (at least one other part of the combustion charge being air), and
a control device to operate the internal combustion engine.
Each piston-cylinder-unit has at least:
a cylindrical main combustion chamber for combustion of a combustion charge, a volume of the main combustion chamber being defined by the at least one cylinder head and a reciprocally moving piston, the motion of the piston defining a variable volume of the main combustion chamber having a geometrical compression ratio between 12 and 22, preferably between 15 and 22, in particular preferably between 18 and 20,
at least one intake valve coupled to the intake manifold, and
an ignition device to start combustion of the combustion charge.

The ammonia source can provide ammonia:
via the intake manifold and the at least one intake valve as part of a mixture of at least air and ammonia, and/or
via at least one further valve (which is different from the at least one intake valve) provided to the piston-cylinder-unit.

The control device is at least configured to control:
the intercooler to provide a gaseous medium with a temperature of at least 60° C., preferably with a temperature of at least 80° C., to the intake manifold, wherein preferably the intercooler is controlled to keep the temperature below 220° C., and/or
a lambda (lambda of the mixture of air and fuel, the fuel being the ammonia provided to the combustion chamber and any additional fuel that might be present, such as hydrogen) of the combustion charge inside each main combustion chamber to lie between 0.9 and 1.2, preferably between 0.98 and 1.02, and/or
the control device is configured to control the ignition device to start combustion of the combustion charges in each piston-cylinder-unit between −35 degrees to −10 degrees TDC (top dead center)

Although the addition of hydrogen as a combustion promoter is not necessary, in some embodiments, there is provided a hydrogen source for providing hydrogen to each piston-cylinder-unit and the control device is configured to provide hydrogen to each piston-cylinder-unit in a range of 0 to 2 mass %, preferably of 0 to 1 mass %, in particular 0 to 0.3 mass % (note that all mass % of hydrogen are given with respect to the total fuel mass brought into a combustion chamber).

In such embodiments, it can be provided that:
the hydrogen source is provided in the form of a hydrogen tank, and/or
the hydrogen source is provided in the form of a reformer for cracking ammonia to reach a range of 0 to 2 mass %, preferably of 0 to 1 mass %, in particular 0 to 0.3 mass %

Preferably, an internal combustion engine according to certain embodiments of the invention can be provided wherein a diameter of each main combustion chamber is at least 130 mm.

In some embodiments, the internal combustion engine comprises an exhaust manifold coupled to the plurality of piston-cylinder-units.

In these embodiments, there can be provided at least one catalytic converter, preferably a three-way-catalytic-converter or a SCR-converter, coupled to the exhaust manifold.

In some embodiments, the internal combustion engine comprises at least one turbocharger to charge the gaseous medium provided to the intake manifold.

In some embodiments, a brake mean effective pressure of the internal combustion engine is higher than 10 bar, preferably higher than 15 bar, in particular higher than 18 bar.

In some embodiments, for each of the piston-cylinder-units the ignition device, preferably a spark plug, is arranged in the main combustion chamber to directly start combustion of the combustion charge.

In other embodiments, for each of the piston-cylinder-units the ignition device, preferably a spark plug, is arranged inside a prechamber, which is coupled to the main combustion chamber, and ignition of the combustion charge inside the main combustion chamber is started by the ignition device indirectly via flame torches, which enter the main combustion chamber from the prechamber and are created by the ignition of an ignitable air-fuel-mixture inside the prechamber.

In these embodiments, it can be provided that in addition to the at least one intake valve provided to the main combustion chamber, there is at least one further valve provided to the prechamber and ammonia is provided to the prechamber via the at least one further valve provided to the prechamber. Preferably, in certain embodiments, one valve of the at least one further valve for providing ammonia to the prechamber is a gas valve for providing ammonia in gaseous form, possibly mixed with air, to the prechamber, preferably enriched with hydrogen.

In some embodiments, the control device is configured to provide ammonia to the main combustion chamber in liquid form after opening of the at least one intake valve until 50 degrees crank angle before the piston reaches TDC. This ensures that ammonia is introduced when the pressure in the cylinder is not too high to be negative with respect to the energy balance (such that ammonia does not have to be injected with too high a pressure or too late in the compression stage).

In these embodiments, it can be provided that the geometrical compression ratio of the main combustion chamber is between 16 and 22 and the control device is configured to control the intercooler to provide air with a temperature of at least 80° C.

If ammonia in liquid form is used, it should be considered that for combustion the ammonia has to be evaporated, which needs additional energy when compared to using gaseous ammonia. To provide the additional energy, it is advantageous to (compared to when gaseous ammonia is used)

to increase the temperature of the gaseous medium, which is to be mixed with the liquid ammonia, and/or
    to design the combustion chambers with a higher geometrical compression ratio to reach a desired temperature for combustion.

In some embodiments, the ammonia source provides or stores ammonia in liquid form, and there is provided a heat exchanger to use energy of exhaust gas to evaporate the ammonia into a gaseous form, which is then provided to the main combustion chambers.

In some embodiments, the internal combustion engine can be provided with:
    optionally at least one turbocharger followed by
    at least one intercooler
    optionally followed by a throttle valve
    followed by the intake manifold which is coupled to
    the piston-cylinder-units which are coupled to
    the exhaust manifold followed by
    a turbine of the optional at least one turbocharger followed by
    an optional catalytic converter followed by
    an optional heat exchanger.

In some embodiments, the control device is configured to control the intake valves and the exhaust valves of the piston-cylinder-units with overlapping opening times to provide internal EGR (exhaust gas recirculation), preferably with a rate (defined as mass of EGR/(mass of fuel+mass of air+mass of EGR) larger than 0% and below 10%, in particular with a rate larger than 0% and below 5%.

In a combined-heat-and-power plant (CHP plant) according to certain embodiments of the invention, in particular a plant comprising an internal combustion engine according to certain embodiments of the invention, the plant comprises a first stage heat exchanger to use a majority part of the energy of exhaust gas to provide heat to an external facility coupled to the plant and there is a second stage heat exchanger downstream of the first exchanger, which uses energy of exhaust gas to evaporate ammonia which is provided from an ammonia source in liquid form into a gaseous form, which is then provided to at least one internal combustion engine, preferably a reciprocating piston engine or a turbine.

Ammonia is typically stored in a liquid form for minimizing storage volume demand. In case it is introduced in a gaseous form into an internal combustion engine, it must be evaporated first. Due to the high evaporation heat (~1200 KJ/kg at ambient temperature), a heat source it needed.

In a CHP application a certain temperature level (typically 70-90° C.) is needed, which is mostly determined by the design of the heating network and the type of consumers. To maximize the heat usage, all waste heat sources (for example jacket water, charge cooler, oil cooler, exhaust heat exchanger) are typically used. Due to the lower end of the heating water temperature, there is also a minimum exhaust gas temperature which is reachable (for example theoretically 70° C. water temperature means 70° C. exhaust heat, in reality a certain delta T is used to avoid excessive heat exchanger areas). While the evaporation heat of ammonia is high, the temperature level needed is low (about 20-50° C., depending on fuel pressure), therefore the remaining exhaust heat can be utilized to evaporate the ammonia via an additional (next to the CHP-usage) exhaust heat exchanger.

BRIEF DESCRIPTION OF THE DRAWINGS

Embodiments of the invention are discussed with reference to FIGS. 1 to 5.

DETAILED DESCRIPTION

Figure 1:
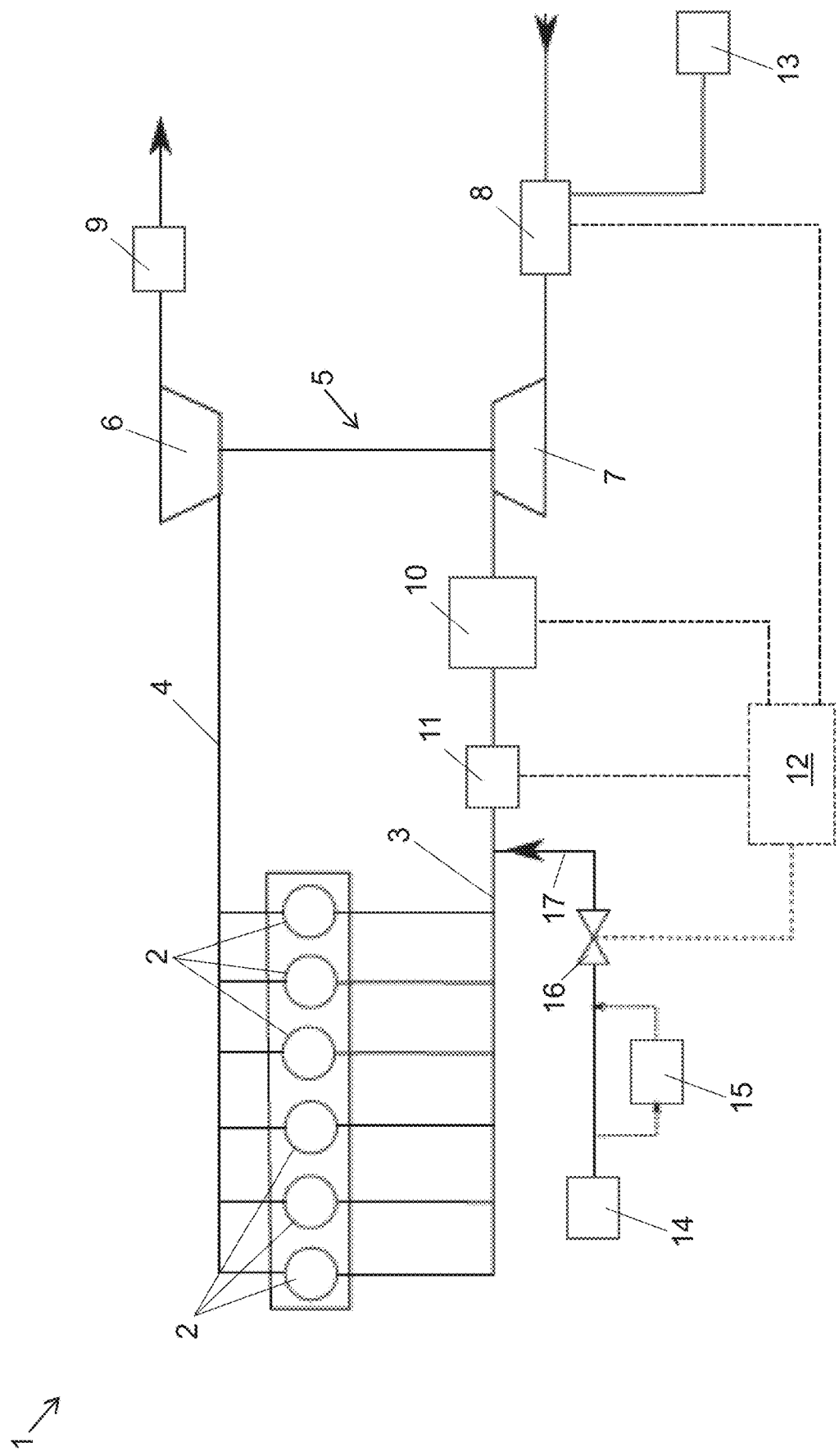
FIGS. 1 to 3 show different embodiments of an internal combustion engine according to the invention.

FIG. 1 shows an internal combustion engine 1 comprising an intake manifold 3, which can provide gaseous medium (air, a mixture of air and ammonia in gaseous form, a mixture of air and ammonia partly in liquid and partly in gaseous form, one of the aforementioned with a combustion promoter in liquid or gaseous form) to a plurality of piston-cylinder-units, at least one intercooler 10 coupled to the intake manifold 3 and at least one cylinder head with a plurality of piston-cylinder-units.

Each piston-cylinder-unit has at least a cylindrical main combustion chamber 2 for combustion of a combustion charge, a volume of the main combustion chamber 2 being defined by the at least one cylinder head and a reciprocally moving piston, the motion of the piston defining a variable volume geometry of the main combustion chamber having a geometrical compression ratio between 12 and 22.

Furthermore, each piston-cylinder-unit has at least one intake valve coupled to the intake manifold 3 and an ignition device to start combustion of the combustion charge.

The internal combustion engine 1 is provided with at least one ammonia source (two ammonia sources 13, 14 are shown in the figures) for providing ammonia to each piston-cylinder-unit as part of the combustion charge via the intake manifold 3 and the at least one intake valve as part of gaseous medium in form of a mixture of at least air and ammonia.

The internal combustion engine 1 has a control device 12 (or controller), which is configured to control the intercooler 10 to provide gaseous medium with a temperature of at least 60° C. to the intake manifold and control a lambda of the combustion charge inside each main combustion chamber 2 to be between 0.9 and 1.02 (in this embodiment, by controlling a gas mixer 8 to which one of the ammonia sources 13, 14 is coupled).

The control device 12 is further configured to control a throttle valve 11 and a control valve 16, which allows addition of ammonia coming from an ammonia source 14 enriched with hydrogen generated by a reformer 15 to the intake manifold 3 via an ammonia supply line 17. In certain embodiments, a hydrogen tank could be used as a hydrogen source instead of a reformer 15.

The gaseous medium provided to the intake manifold 3 is charged by a compressor of a turbocharger 5, which is driven by an exhaust turbine 6 of the turbocharger, which is arranged in the exhaust manifold 4.

A catalytic converter 9 is also coupled to the exhaust manifold 4.

Figure 2:
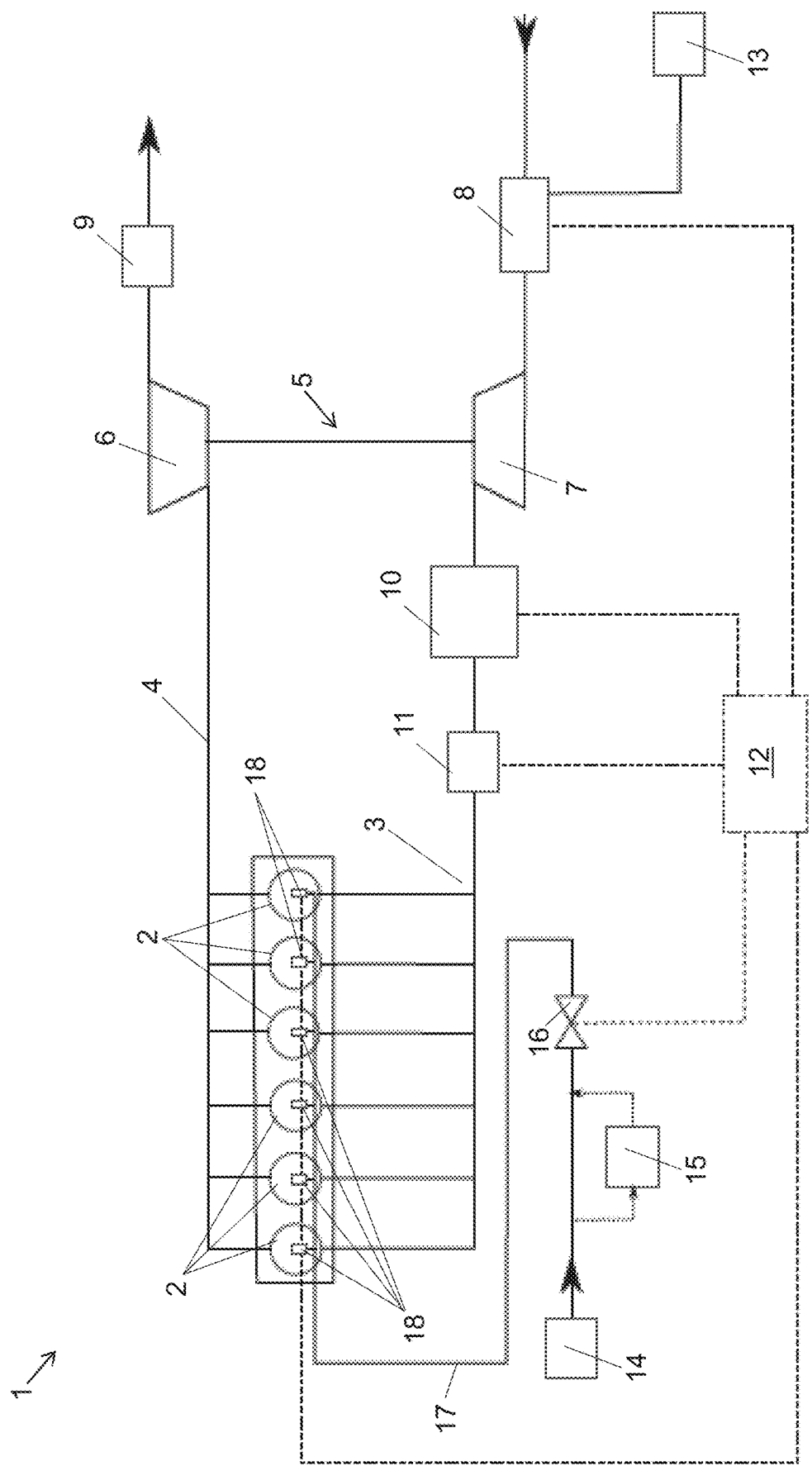

The embodiment of FIG. 2 differs from the one shown in FIG. 1 in that ammonia enriched with hydrogen generated by the reformer 15 is introduced into the main combustion chambers 2 by injectors 18, which are controlled by the control device 12.

Figure 3:
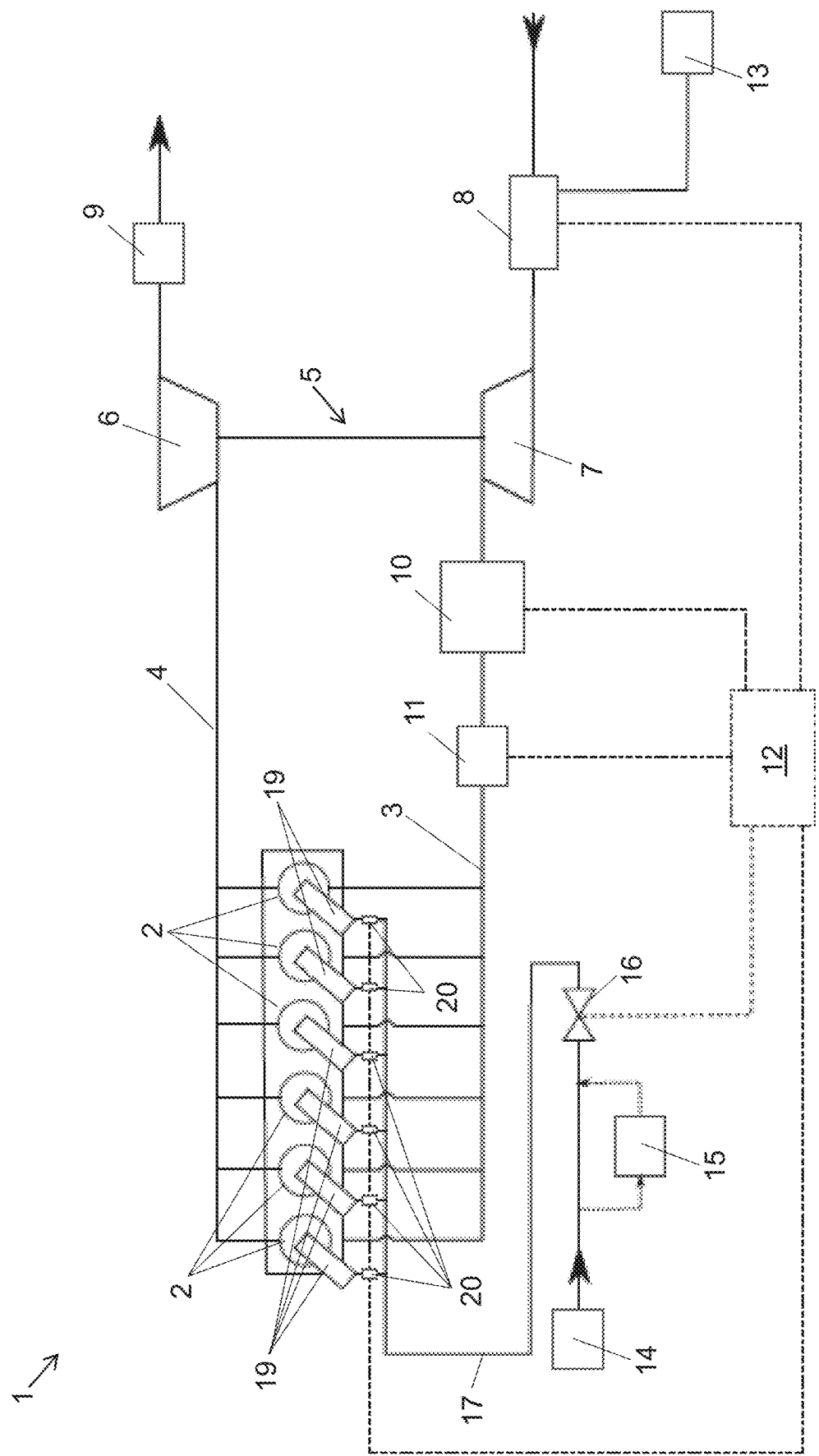

The embodiment of FIG. 3 differs from the one shown in FIG. 2 in that each piston-cylinder-unit is provided with a prechamber 19, in which the ignition device is arranged. The ammonia enriched with hydrogen generated by the reformer 15 is provided to the prechambers 19 via further valves 20 (which can be, by way of example, in the form of injectors 18).

Figure 4:
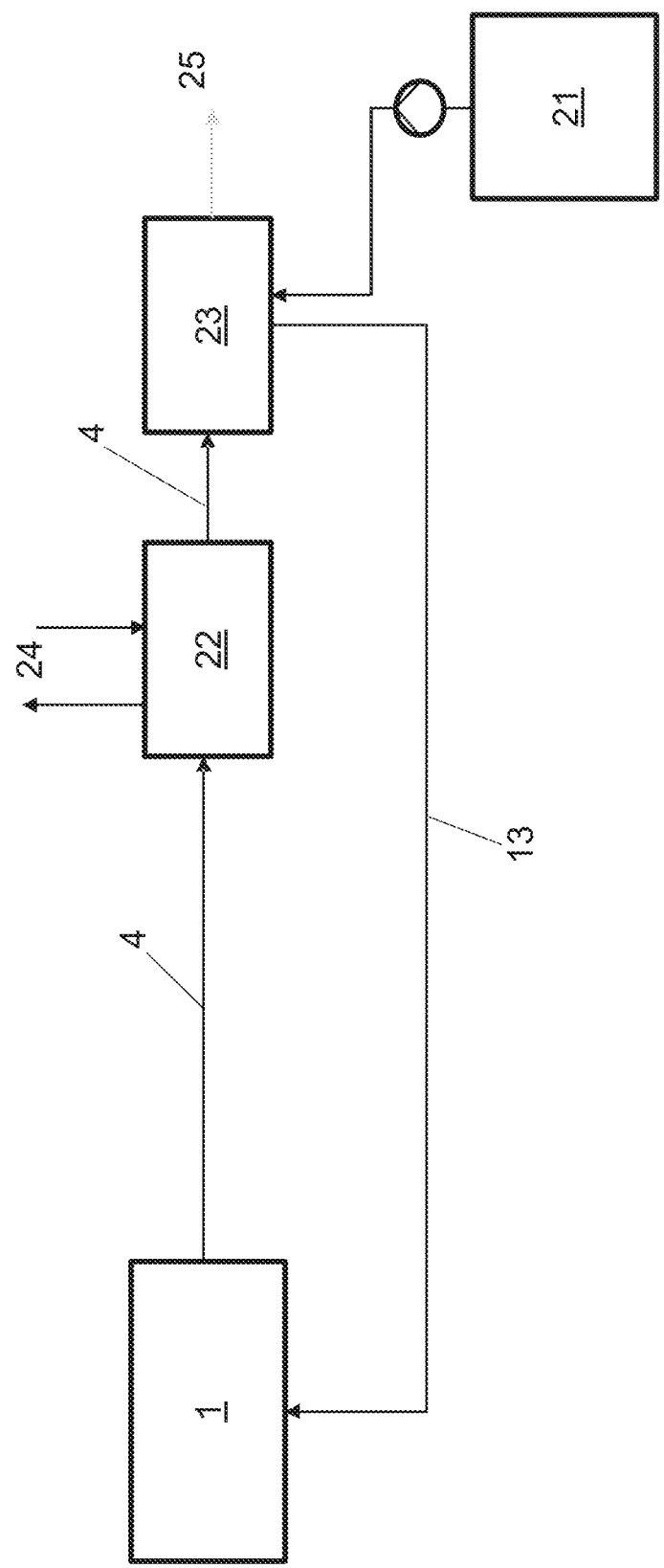
FIGS. 4 and 5 show different embodiments of a combined-heat-and-power plant according to the invention.

A CHP plant according to a first embodiment is shown in FIG. 4. This CHP plant comprises an internal combustion engine 1, for example according to one of the embodiments discussed above. The exhaust manifold 4 of the internal combustion engine 1 is coupled with a first stage heat exchanger 22 to exchange heat with a district heating system 24 and with a second stage heat exchanger 23, which uses heat to evaporate ammonia from an ammonia source 21 directly in the exhaust gas heat exchanger, which is designed as an evaporative heat exchanger. A line carrying the evaporated ammonia to the internal combustion engine 1 functions as an ammonia source 13 for the internal combustion engine 1. Exhaust gas is carried from the second stage heat exchanger 23 to a stack 25.

Figure 5:
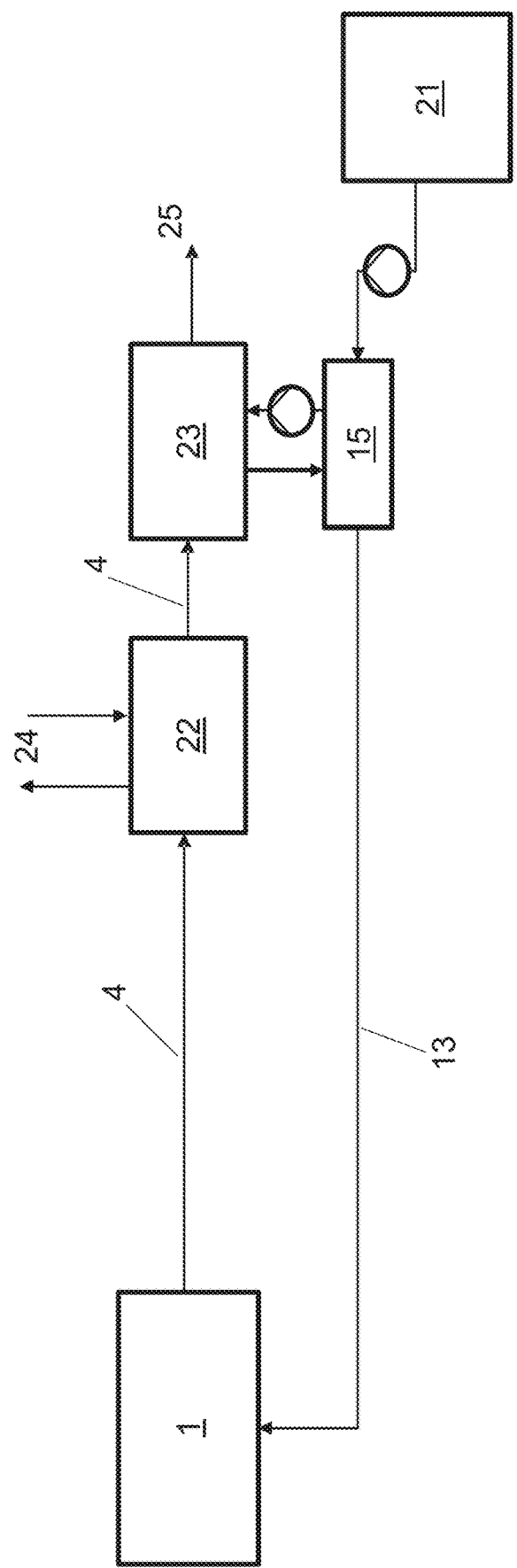

In the embodiment shown in FIG. 5, waste heat recovery is implemented in such a way, that an intermediate circuit (water) and a standard exhaust heat exchanger as a second stage heat exchanger 23 together with a separate ammonia evaporation unit driven by the low temperature water circuit is used.

LIST OF REFERENCE SIGNS

1 internal combustion engine
2 main combustion chamber
3 intake manifold
4 exhaust manifold
5 turbocharger
6. exhaust turbine
7 compressor
8 gas mixer
9 catalytic converter
10 intercooler
11 throttle valve
12 control device
13 ammonia source
14 ammonia source
15 reformer
16 control valve
17 ammonia supply line
18 injector
19 prechamber
20 valve provided to prechamber
21 ammonia source
22 first stage heat exchanger
23 second stage heat exchanger
24 district heating system
25 stack

The invention claimed is:

1. A system, comprising:
   an internal combustion engine, comprising:
      an intake manifold configured to provide a gaseous medium to a plurality of piston-cylinder-units;
      at least one intercooler coupled to the intake manifold;
      at least one cylinder head with the plurality of piston-cylinder-units, each piston-cylinder-unit of the plurality of piston-cylinder-units having at least:
         a cylindrical main combustion chamber configured to combust a combustion charge, wherein a volume of the main combustion chamber is defined by the at least one cylinder head and a reciprocally moving piston, the motion of the piston defining a variable volume geometry of the main combustion chamber having a geometrical compression ratio between 12 and 22;
         at least one intake valve coupled to the intake manifold;
         an igniter configured to start combustion of the combustion charge;
      at least one ammonia source configured to provide ammonia to each piston-cylinder-unit of the plurality of piston-cylinder-units as part of the combustion charge:
         via the intake manifold and the at least one intake valve as part of the gaseous medium in form of a mixture of at least air and ammonia; and/or
         via at least one further valve provided to each piston-cylinder-unit of the plurality of piston-cylinder-units;
      a hydrogen source configured to provide hydrogen to each piston-cylinder-unit of the plurality of piston-cylinder-units;
      a controller configured to operate the internal combustion engine, wherein the controller is configured to at least:
         control the at least one intercooler to provide the gaseous medium with a temperature of at least 60° C. to the intake manifold;
         control a lambda of the combustion charge inside each main combustion chamber to be between 0.9 and 1.2; and
         control the hydrogen provided to each piston-cylinder-unit of the plurality of piston-cylinder-units in a range of 0 to 2 mass %.

2. The system of claim 1, wherein
the variable volume geometry of the main combustion chamber is defined with a geometrical compression ratio between 15 and 22;

the controller is configured to control the at least one intercooler to provide the gaseous medium with a temperature of at least 80° C.;

the controller is configured to control the at least one intercooler to provide the gaseous medium with a temperature below 220° C.;

the controller is configured to control the lambda of the combustion charge to be between 0.98 and 1.02; and the controller is configured to control the igniter to start combustion of the combustion charge in each piston-cylinder-unit of the plurality of piston-cylinder-units between −35 degrees to −10 degrees before top dead center (TDC).

3. The system of claim 1, wherein the hydrogen source comprises:
a hydrogen tank; and/or
a reformer configured to crack ammonia to reach a range of 0 to 2 mass %.

4. The system of claim 1, wherein the internal combustion engine comprises an exhaust manifold coupled to the plurality of piston-cylinder-units by exhaust valves and at least one catalytic converter coupled to the exhaust manifold.

5. The system of claim 4, wherein the controller is configured to control the intake valves and the exhaust valves of the plurality of piston-cylinder-units with overlapping opening times to provide internal exhaust gas recirculation (EGR) with a rate larger than 0% and below 10%.

6. The system of claim 1, wherein the internal combustion engine comprises at least one turbocharger configured to charge the gaseous medium provided to the intake manifold.

7. The system of claim 1, wherein a brake mean effective pressure of the internal combustion engine is higher than 10 bar.

8. The system of claim 1, wherein for each of the plurality of piston-cylinder-units, the igniter is arranged inside a prechamber coupled to the main combustion chamber, and ignition of the combustion charge inside the main combustion chamber is started by the igniter indirectly via flame torches which enter the main combustion chamber from the prechamber and are created by an ignition of an ignitable air-fuel-mixture inside the prechamber.

9. The system of claim 8, comprising the at least one intake valve provided to the main combustion chamber and the at least one further valve provided to the prechamber, wherein the at least one further valve is configured to provide the ammonia to the prechamber.

10. The system of claim 9, wherein one valve of the at least one further valve comprises a gas valve configured to provide the ammonia in gaseous form to the prechamber.

11. The system of claim 1, wherein the controller is configured to provide ammonia to the main combustion chamber in liquid form after opening of the at least one intake valve until 50 degrees crank angle before the piston reaches top dead center (TDC).

12. The system of claim 11, wherein a geometrical compression ratio of the main combustion chamber is between 16 and 22 and the controller is configured to control the at least one intercooler to provide air with a temperature of at least 80° C.

13. The system of claim 1, wherein the at least one ammonia source stores ammonia in liquid form and heat exchanger is configured to use energy of exhaust gas to evaporate the ammonia into a gaseous form for supply to the main combustion chambers.

14. The system of claim 1, further comprising a combined-heat-and-power plant comprising first and second stage heat exchangers, wherein the first stage heat exchanger is configured to use a majority part of the energy of exhaust gas to provide heat to an external facility coupled to the combined-heat-and-power plant, wherein the second stage heat exchanger is downstream of the first stage heat exchanger, wherein the second stage heat exchanger is configured to use the energy of exhaust gas to evaporate ammonia from the at least one ammonia source in liquid form into a gaseous form for supply to at least one internal combustion engine.

15. A system, comprising:
at least one ammonia source configured to provide ammonia as part of a combustion charge to each piston-cylinder-unit of a plurality of piston-cylinder-units of an internal combustion engine:
via an intake manifold and at least one intake valve as part of a gaseous medium in form of a mixture of at least air and ammonia; and/or
via at least one further valve provided to each piston-cylinder-unit of the plurality of piston-cylinder-units;
a hydrogen source configured to provide hydrogen to each piston-cylinder-unit of the plurality of piston-cylinder-units; and
a controller configured to operate the internal combustion engine, wherein the controller is configured to at least:
control at least one intercooler to provide the gaseous medium with a temperature of at least 60° C. to the intake manifold;
control a lambda of the combustion charge inside a main combustion chamber of each piston-cylinder-unit of the plurality of piston-cylinder-units to be between 0.9 and 1.2; and
control the hydrogen provided to each piston-cylinder-unit of the plurality of piston-cylinder-units in a range of 0 to 2 mass %.

16. The system of claim 15, wherein the controller is configured to control the at least one ammonia source to provide the ammonia to each piston-cylinder-unit of the plurality of piston-cylinder-units, and the internal combustion engine.

17. The system of claim 16, further comprising the internal combustion engine coupled to an electrical generator.

18. A method, comprising:
supplying, via at least one ammonia source, ammonia as part of a combustion charge to each piston-cylinder-unit of a plurality of piston-cylinder-units of an internal combustion engine:
via an intake manifold and at least one intake valve as part of a gaseous medium in form of a mixture of at least air and ammonia; and/or
via at least one further valve provided to each piston-cylinder-unit of the plurality of piston-cylinder-units;
supplying, via a hydrogen source, hydrogen to each piston-cylinder-unit of the plurality of piston-cylinder-units; and
controlling, via a controller, operation of the internal combustion engine, wherein controlling comprises at least:
controlling at least one intercooler to provide the gaseous medium with a temperature of at least 60° C. to the intake manifold;
controlling a lambda of the combustion charge inside a main combustion chamber of each piston-cylinder-unit of the plurality of piston-cylinder-units to be between 0.9 and 1.2; and controlling the hydrogen provided to each piston-cylinder-unit of the plurality of piston-cylinder-units in a range of 0 to 2 mass %.

19. A system, comprising:

an internal combustion engine, comprising:
- an intake manifold configured to provide a gaseous medium to a plurality of piston-cylinder-units;
- at least one intercooler coupled to the intake manifold;
- at least one cylinder head with the plurality of piston-cylinder-units, each piston-cylinder-unit of the plurality of piston-cylinder-units having at least:
  - a cylindrical main combustion chamber configured to combust a combustion charge, wherein a volume of the main combustion chamber is defined by the at least one cylinder head and a reciprocally moving piston, the motion of the piston defining a variable volume geometry of the main combustion chamber having a geometrical compression ratio between 12 and 22;
  - at least one intake valve coupled to the intake manifold;
  - an igniter configured to start combustion of the combustion charge;
- at least one ammonia source configured to provide ammonia to each piston-cylinder-unit of the plurality of piston-cylinder-units as part of the combustion charge:
  - via the intake manifold and the at least one intake valve as part of the gaseous medium in form of a mixture of at least air and ammonia; and/or
  - via at least one further valve provided to each piston-cylinder-unit of the plurality of piston-cylinder-units;
- a controller configured to operate the internal combustion engine, wherein the controller is configured to at least:
  - control the at least one intercooler to provide the gaseous medium with a temperature of at least 60° C. to the intake manifold; and
  - control a lambda of the combustion charge inside each main combustion chamber to be between 0.9 and 1.2; and a combined-heat-and-power plant comprising first and second stage heat exchangers, wherein the first stage heat exchanger is configured to use a majority part of the energy of exhaust gas to provide heat to an external facility coupled to the combined-heat-and-power plant, wherein the second stage heat exchanger is downstream of the first stage heat exchanger, wherein the second stage heat exchanger is configured to use the energy of exhaust gas to evaporate ammonia from the at least one ammonia source in liquid form into a gaseous form for supply to at least one internal combustion engine.

* * * * *